United States Patent
Gronau et al.

[19]

[11] Patent Number: 6,003,960
[45] Date of Patent: Dec. 21, 1999

[54] HYDRAULIC BRAKING SYSTEM WITH ELECTRONIC BRAKING PRESSURE REGULATION

[75] Inventors: Ralph Gronau, Wetter; Gunther Buschmann, Idstein, both of Germany

[73] Assignee: ITT Manufacturing Enterprises Inc., Wilmington, Del.

[21] Appl. No.: 08/930,681

[22] PCT Filed: Mar. 6, 1996

[86] PCT No.: PCT/EP96/00937

§ 371 Date: Dec. 18, 1997

§ 102(e) Date: Dec. 18, 1997

[87] PCT Pub. No.: WO96/33080

PCT Pub. Date: Oct. 24, 1996

[30] Foreign Application Priority Data

Apr. 15, 1995 [DE] Germany .......................... 195 14 171

[51] Int. Cl.$^6$ ..................................................... B60T 8/36
[52] U.S. Cl. ................... 303/167; 303/166; 303/DIG. 3; 303/DIG. 4
[58] Field of Search ........................ 303/DIG. 3, DIG. 4, 303/119.2, 121–199; 701/78, 70, 71, 79, 83

[56] References Cited

U.S. PATENT DOCUMENTS 5,551,770  9/1996  Hrovat et al. ...................... 303/DIG. 4

FOREIGN PATENT DOCUMENTS 22 57 236  5/1974  Germany .
44 40 531  5/1995  Germany .
2 182 740  5/1987  United Kingdom .

OTHER PUBLICATIONS

Search Report of the German Patent Office Relating to Parent German Patent Application No. 195 14 171.7.

*Primary Examiner*—Douglas C. Butler
*Attorney, Agent, or Firm*—Rader, Fishman & Grauer PLLC

[57] ABSTRACT

A brake system with electronic braking pressure control, including a braking pressure generator, electrically operable hydraulic valves, and an electronic analyzing, is provided with an acoustic sensor which is used to determine the change-over behavior of the hydraulic valves for the approximate determination of the braking pressure prevailing in the braking pressure generator and/or in the wheel brakes. The measured pressure values, in the capacity of control quantities, are taken into account for braking pressure control or analyzed for monitoring purposes.

11 Claims, 2 Drawing Sheets

HYDRAULIC BRAKING SYSTEM WITH ELECTRONIC BRAKING PRESSURE REGULATION

BACKGROUND OF THE INVENTION

The present invention relates to a hydraulic brake system Such systems are, among others, anti-lock systems (ABS), traction slip control systems (TCS) and driving stability control systems (DSC, ASMS).

In prior art and customary brake systems with electronic braking pressure control, the pilot pressure, i.e. the pressure in the braking pressure generator or in the master cylinder which is responsive to pedal application, and the braking pressure prevailing in the individual wheel brakes is not measured, although the control could be considerably improved in some situations by taking into account the actual pressure. Monitoring of the systems could also be simplified or improved by measuring the pressure. Pressure measurement in brake systems with ABS or TCS is not performed mainly for cost reasons. In other control systems, pressure measurement is imperative.

An object of the present invention is to develop a brake system of the previously mentioned type which takes into account the pressure actually prevailing in the braking pressure generator and/or in the individual wheel brakes for the control. Nevertheless, the brake system should require only comparatively limited expenditure in manufacture.

SUMMARY OF THE INVENTION

It has been found that this object can be achieved by the brake system of the present invention. The special features of the brake system of the present invention include that the change-over behavior of the hydraulic valves during control operations is sensed by sensors and is evaluated for the approximate determination of the braking pressure prevailing in the braking pressure generator and/or in the individual wheel brakes.

In a preferred aspect of the present invention, wherein the hydraulic valves include valve tappets arranged in a valve housing which are moved to a final position when the hydraulic valves are actuated, the sensors, are configured as acoustic sensors or vibration or acceleration pickups to determine the change-over behavior of the valves. The sensors sense the sound vibrations caused when the valve tappet moves to sit on a valve stop or on the valve seat.

The present invention is based on the knowledge that the pressure in the master cylinder and in the wheel brakes can be derived with a sufficient degree of accuracy from the change-over behavior of the hydraulic valves. This task does not require pressure sensors, but only one single bone-conduction sensor (or, in special cases, also a plurality of acoustic sensors). The sensors which can be semiconductor sensors permit being mounted on the valve housing, i.e. outside the actual hydraulic system, and hence do not involve a safety risk.

Further features, advantages and possible applications of the present invention can be seen in the following description of embodiments, making reference to the accompanying drawings.

DETAILED DESCRIPTION OF THE DRAWINGS

Figure 1:
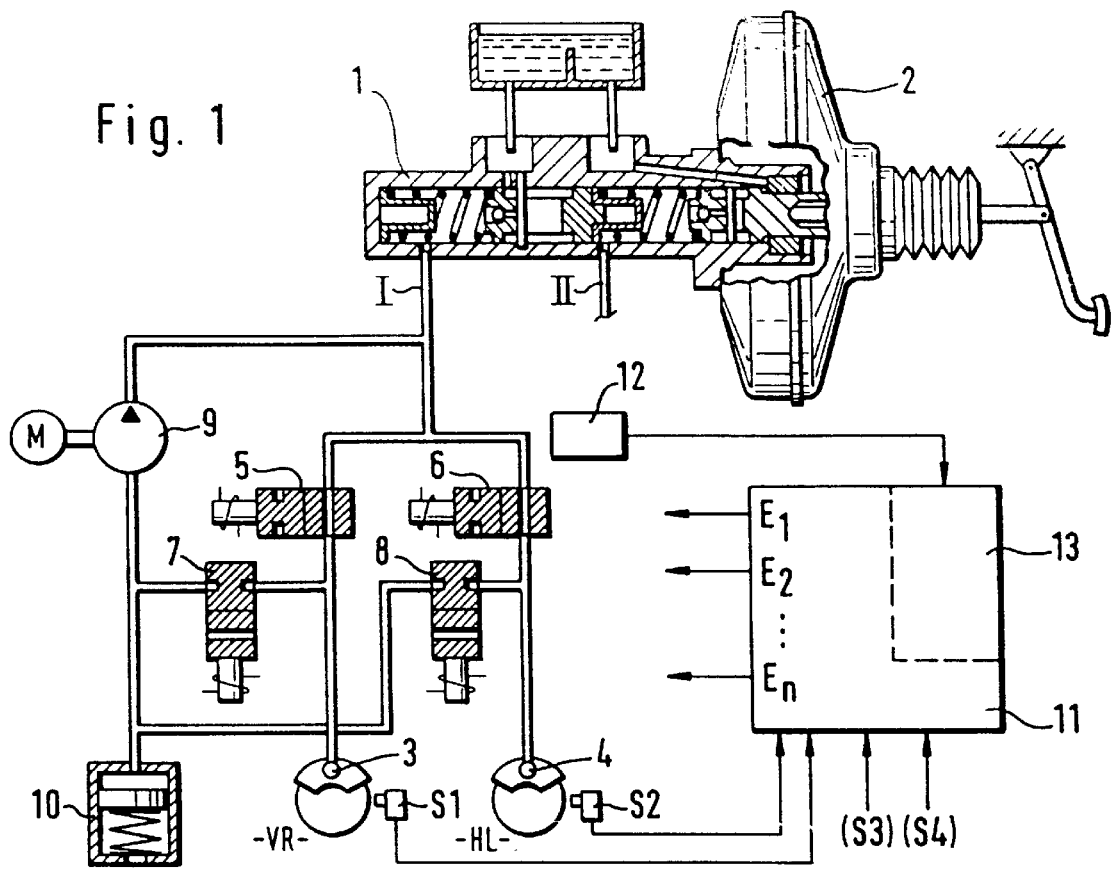
FIG. 1 is a schematic view of the most important hydraulic and electronic components of a brake system with anti-lock control (ABS).

FIG. 1 shows in an anti-lock brake system a tandem master cylinder 1, preceded by a pedal-operated vacuum booster 2, and a hydraulic brake circuit I to which the wheels of a diagonal or an axle are connected. The second brake circuit II has the same components as the brake circuit I and, therefore, is not illustrated.

An inlet valve 5, 6 is respectively inserted into the pressure fluid lines leading from the master cylinder to the wheel brakes 3, 4 of the wheels VR, HL. Further, the wheel brakes 3, 4 are connected to the suction side of a hydraulic pump 9 and a low-pressure accumulator 10 by way of pressure fluid return lines in which outlet valves 7, 8 are provided. The pressure side of the hydraulic pump 9 leads back to the master cylinder side of the brake circuit I. Thus, the system is a "closed-loop" brake system.

In their inactive position, the inlet valves 5, 6 are open and, after actuation, close the associated pressure fluid conduit to the wheel brake 3 or 4. In contrast thereto, the outlet valves 7, 8 close the pressure fluid passage in their inactive position. The valves 5 to 8 are electromagnetically operable two-way/two-position directional control valves in the present embodiment.

The brake system of FIG. 1 includes an electronic controller 11 which comprises an electronic circuit for the evaluation of control signals and the generation of braking pressure control signals by which the valves 5 to 8 are actuated. Activation and deactivation of the hydraulic pump 9 or the electric drive motor M of the pump is also effected by a controller circuit 11. Input signals for anti-lock control are mainly produced by wheel sensors S1, S2 having output signals which represent the rotational behavior of the two wheels VR, HL. Inputs for the corresponding sensor signals of the other two vehicle wheels, which are not shown, are also indicated (S3, S4). Outputs $E_1$ to $E_n$ of the analyzing circuit 11 lead to the hydraulic valves 5 to 8 and to the pump drive motor M.

Also, a an acoustic sensor 12 or acceleration or vibration pickup is provided according to the present invention, the purpose of which is to determine the change-over behavior of the hydraulic valves during a control action. This change-over behavior of the hydraulic valves is finally used for the approximate determination of the pressure in the master cylinder 1, i.e. the pilot pressure, and/or for determining the braking pressure in the individual wheel brakes 3 and 4, as will be explained hereinbelow by way of the diagrams in FIGS. 3 and 4.

The output of the acoustic sensor 12 in the embodiment of FIG. 1 extends to a partial circuit 13 (shown in dotted lines) of the analyzing circuit 11. The partial circuit 13 includes the circuits for the analysis of the solid-borne sound and a calibration circuit. When the analyzing circuit 11 is a programmed circuit on the basis of microcomputers, microcontrollers, or the like, the partial circuit 13 represents a corresponding program part.

Figure 2:
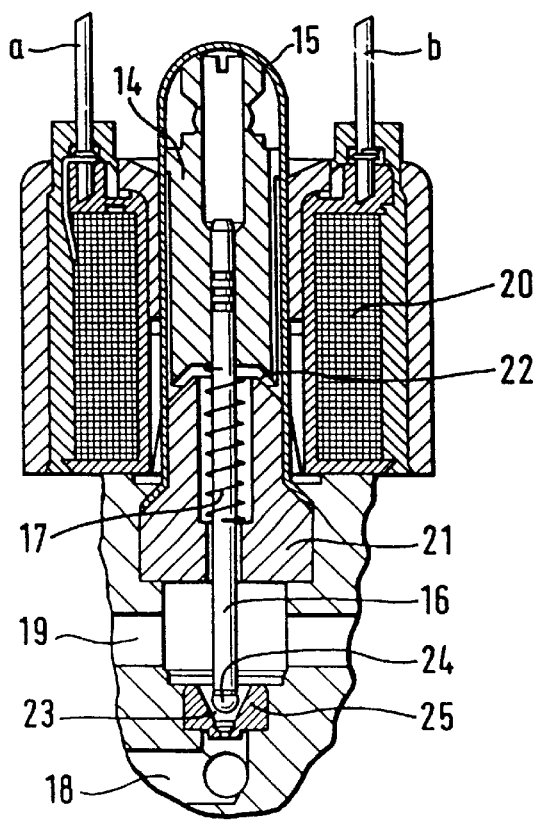
FIG. 2 is a cross-sectional view of an inlet valve of the type used in the present invention.

The sound caused by the hydraulic valves 5 to 8 during change-over in defined phases of operation is determined and evaluated by the acoustic sensor 12. FIG. 2 shows the basic design of a two-way/two-position directional control valve 5 to 8 of this type. A longitudinal cross-section through the hydraulic valve is shown in FIG. 2. The valve basically includes a valve armature 14 which is axially slidably accommodated in a valve housing 15. A valve tappet 16 is part of the armature 14. The armature 14, along with the valve tappet 16, is retained in the position shown (which is the inactive valve position) by the force of a helical spring 17. There is a hydraulic connection between a hydraulic port or inlet 18 to an outlet 19 in this inactive position. The inlet 18 is connected to the master cylinder 1 (see FIG. 1), the outlet 19 leads to a wheel brake 3, 4. Thus, one of the two inlet valves 5 or 6 of FIG. 1 in concerned.

The hydraulic valve shown has a valve actuation coil 20 and a magnetic core 21. The valve armature 14 and the magnetic core 21 are isolated by an air gap 22 which influences the valve characteristics. Hydraulic valves of this type are known in the art. The electric connecting lines a, b used to actuate the valve are also shown.

Upon actuation of the hydraulic valve of FIG. 2, a force is applied to the valve armature 14 causing axial displacement of the-valve tappet 16 and, thus, closing of the aperture 23. The solid-borne sound caused when the tappet 16 or the valve head 24 sits on a valve seat 25 is measured, according to the present invention, by a acoustic sensor 12 (see FIG. 1) which is arranged at an appropriate point on the valve housing (this is not shown in FIG. 2). Sensor 12 is connected to the valve housing 15 in an undampened manner in order that the solid-borne sound is transmitted to the sensor 12.

It is known to structurally combine the inlet and outlet valves in a valve block. The sound caused by a plurality of valves may be measured by one single acoustic sensor 12 when it is ensured that the valves are not actuated simultaneously but consecutively. The allocation of the sound to the respective valve can be derived from the individual valve actuation signals.

Figures 3A, 3B:
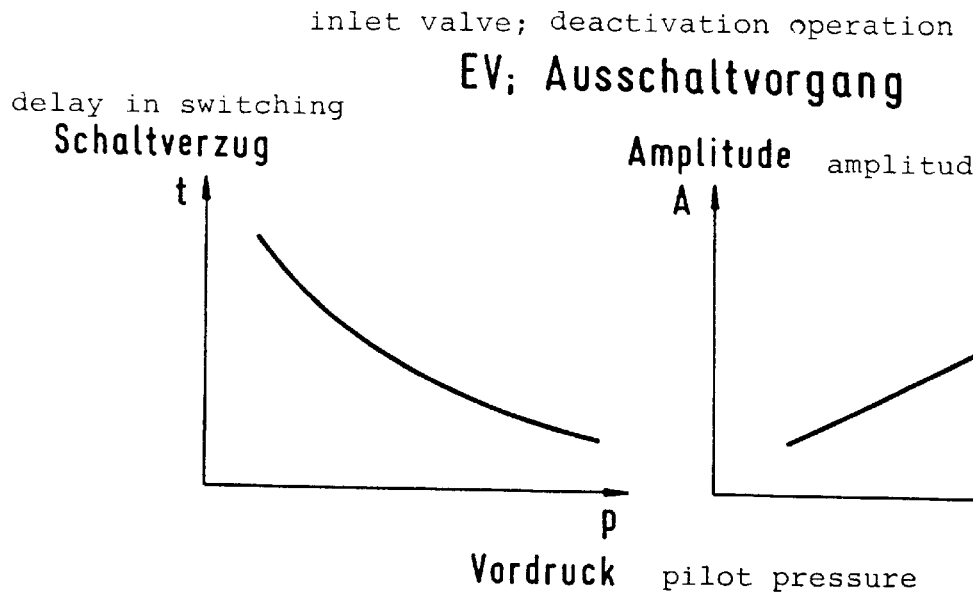
FIGS. 3(A) and 3(B) are diagrams showing the dependence of the delay in switching (FIG. 3A) and the sound amplitude (3B) on the master cylinder pressure.
Figures 4A, 4B:
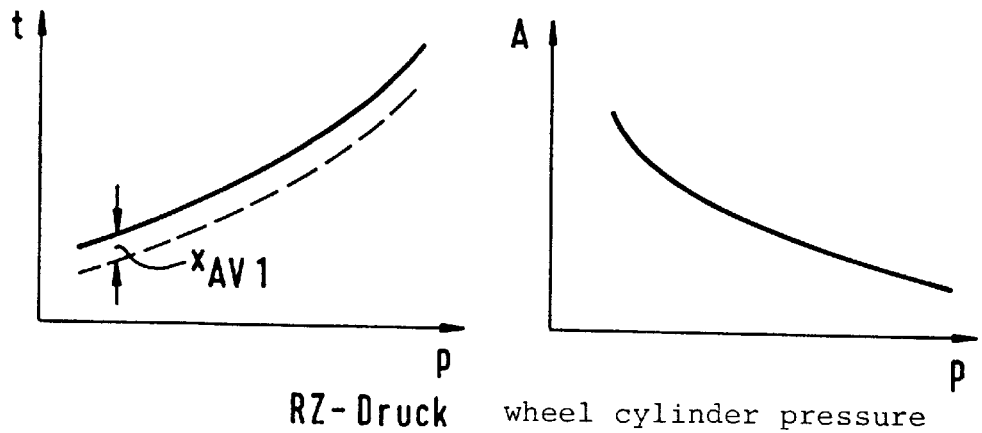
FIGS. 4(A) and 4(B) show, in the same representation as FIG. 3, a diagram plotting the dependence of the delay in switching (4A) and the sound amplitude (4B) on the pressure in the wheel brake.

According to the present invention, the switching behavior of the hydraulic valves is measured and evaluated, i.e. the time delay in switching or the period between the electric actuation of the valve and the abutment of the valve tappet, and/or the intensity or amplitude of the solid-borne sound caused by abutment of the tappet. It can be seen in the diagrams in FIGS. 3A, 3B, 4A, and 4B that, principally, there is a relationship between the delay in switching and the respectively prevailing pressure (FIG. 3A, FIG. 4A) and between the sound amplitude and the pressure (FIGS. 3B, 4B). These relations are more or less distinct, depending on the valve design and the respective switching operation (activation or deactivation).

It can be appropriate to determine empirically those hydraulic valves of a control system and those switching operations where the dependence of the switching behavior or the sound amplitude on the pressure is most significant. In the present embodiment which applies to a brake system of the type shown in FIG. 1, the deactivation behavior of the outlet valves 5, 6 is chosen to determine the pilot pressure, i.e. the pressure prevailing in the master cylinder 1, and the activation behavior of the outlet valves 7, 8 is chosen to determine the braking pressure in the respective wheel brake. For example, it can be seen in FIG. 3A that the deactivation of the inlet valve, i.e. the re-opening of the valve, is supported by a relatively high pilot pressure. At a low pilot pressure P, the time delay in switching t is great compared to the delay at high pressure. Consequently, the bone-conduction amplitude rises with rising pressure in the deactivation operation of the inlet valve, as shown in FIG. 3B.

The pressure dependence upon activation of the outlet valve is so-to-speak reverse to the above described deactivation operation of the inlet valve. As can be seen in FIGS. 4A and 4B, the pressure counteracts the activation of the outlet valve. At a low wheel cylinder pressure P, the delay in switching t is relatively small, and the sound amplitude (FIG. 4B) caused by the abutment of the valve tappet on its seat is comparatively high.

It is clear that the dependences shown in FIGS. 3A, 3B, and 4A, 4B, with an appropriate calibration, are suitable to determine the pilot pressure and the wheel cylinder pressure.

The respective variation of the curves according to FIGS. 3A, 3B, 4A, and 4B is influenced, of course, by manufacturing tolerances, by the prevalent temperature, in particular operating temperature, and by other marginal conditions. These influences show in a defined "offset" or in a roughly parallel displacement of the curves shown. The dotted characteristic curve, shown in FIG. 4A, represents this temperature-responsive and/or tolerance-responsive parallel displacement. Matters are similar with respect to the diagrams of FIGS. 3A, 3B, and 4B. According to the present invention, a correction value "$x_{AV1}$" (see FIG. 4A) is determined by a constant calibration by means of a calibration circuit, triggered by recurrent events or by predetermined time steps. The correction value "$x_{AV1}$" is ascertained by the calibration circuit, stored and taken into account when determining, or calculating, the respective pilot pressure or wheel braking pressure. The calibration circuit is appropriately accommodated in the partial circuit 13 (see FIG. 1).

The correction variable or calibration variable "x" can be determined by brief actuation of the valves during conventional braking operations or when the brake is not actuated. A special correction or calibration variable "x" is associated with each valve which shall be taken into account for the determination of pressure. For example, "$x_{AV1}$" is the correction variable for the outlet valve No. 1.

Because the time delays in switching t or the time periods between the actuation of a valve and the abutment of the valve tappet are relatively short, simultaneous actuation of a plurality of valves is rare and can be prevented by a corresponding configuration of the circuit 11. Consequently, an unmistakable allocation of the solid-borne sound caused and the respective valve is possible at any time. Therefore, one single acoustic sensor is generally sufficient. However, it would also be possible in special cases to use a plurality of acoustic sensors and allocate them to defined valves or valve groups.

We claim:

1. Hydraulic brake system with electronic braking pressure control, including a braking pressure generator, electrically operable hydraulic valves which are inserted into pressure fluid lines for the purpose of pressure modulation, a plurality of wheel brakes connected to the pressure fluid lines, sensors for determining control quantities and generating corresponding sensor signals, and an electronic circuit for evaluating the sensor signals and for generating braling pressure control signals which and can be sent to the hydraulic valves, wherein the change-over behavior of at least one hydraulic valve during a control operation is sensed by sensors and evaluated for the approximate determination of a braking pressure prevailing in at least one of the devices braking pressure generator and the individual wheel brakes, and wherein the hydraulic valves include valve tappets arranged in a valve housing which are moved to a final position when the hydraulic valves are actuated, and wherein the sensors for determining the change-over behavior of the hydraulic valves are configured as one of acoustic sensors, acceleration pickups and vibration pickups, which sense sound vibrations caused when the valve tappet moves to sit on a stop.

2. Brake system as claimed in claim 1, wherein the change-over behavior of the hydraulic valves is determined by measuring the time period lapsing between the sending of a valve actuation signal and the abutment of the valve tappet.

3. Brake system as claimed in claim 1, wherein the acoustic sensors are sensitive to acceleration and are arranged in the proximity of the valves.

4. Brake system as claimed in claim 1, wherein the hydraulic valves are structurally combined in a valve block which is coupled to one single acceleration-sensitive detector in an undampened fashion.

5. Brake system as claimed in claim 4, wherein the valve block includes an electronic circuit or is structurally combined with an electronic circuit, and wherein the acceleration-sensitive detector is arranged within the electronic circuit.

6. Brake system as claimed in claim 4, wherein the valve block is at least structurally combined with an electronic circuit, and wherein the acceleration-sensitive detector is configured as part of the electronic circuit.

7. Brake system as claimed in claim 1, wherein for determining the change-over behavior of the hydraulic valves, at least one of the quantities intensity and frequency of at least one sound out of solid-borne and vibrational sounds is determined.

8. Brake system as claimed in claim 1, wherein for determining the pressure prevailing in the at least one device, an activation behavior or a deactivation behavior is evaluated only if defined hydraulic valves having a switching characteristics which shows a maximum pressure dependence.

9. Brake system as claimed in claim 8 which, as hydraulic valves, has inlet valves which are open in their inactive position and are commutable to close, and outlet valves which are closed in their inactive position and are commutable to open, wherein the deactivation behavior of the inlet valves is evaluated to determine the pressure prevailing in the braking pressure generator.

10. Brake system as claimed in claim 8 which, as hydraulic valves, has inlet valves which are open in their inactive position and are commutable to close, and outlet valves which are closed in their inactive position and are commutable to open, wherein the activation behavior of the outlet valve associated with the respective wheel brake is evaluated to determine the pressure prevailing in the wheel brakes.

11. Brake system as claimed in claim 1, wherein the brake system includes a calibration circuit which actuates the hydraulic valves at predetermined times when the brake is not applied, ascertains the switching behavior and stores it as a correction or calibration variable to determine the pressure during a control operation.

* * * * *

UNITED STATES PATENT AND TRADEMARK OFFICE
CERTIFICATE OF CORRECTION

PATENT NO. : 6,003,960
DATED : 12/21/99
INVENTOR(S) : Gronau, Ralph and Buschmann, Gunther It is certified that error appears in the above-identified patent and that said Letters Patent is hereby corrected as shown below:

In column 4, in claim 1, on line 56, please change "braling" to --braking--.

Signed and Sealed this

Twenty-seventh Day of March, 2001

Attest:

NICHOLAS P. GODICI

Attesting Officer

Acting Director of the United States Patent and Trademark Office